United States Patent [19]

Pratt et al.

[11] Patent Number: 4,659,271
[45] Date of Patent: Apr. 21, 1987

[54] FLUSH BREAK BLIND FASTENER

[75] Inventors: John D. Pratt, Rancho Cucamonga; Joseph F. Morrow, Rolling Hills Estate, both of Calif.

[73] Assignee: Monogram Industries, Inc., Culver City, Calif.

[21] Appl. No.: 768,168

[22] Filed: Aug. 21, 1985

Related U.S. Application Data

[63] Continuation of Ser. No. 583,030, Feb. 23, 1984, abandoned.

[51] Int. Cl.[4] ............................................. F16B 13/06
[52] U.S. Cl. ......................................... 411/43; 411/54
[58] Field of Search ................... 411/2, 3, 34, 35, 36, 411/37, 38, 39, 43, 70, 361, 389, 54, 412

[56] References Cited

U.S. PATENT DOCUMENTS

| | | |
|---|---|---|
| 2,099,678 | 11/1937 | Curtis . |
| 2,282,711 | 5/1942 | Eklund ............................... 411/43 |
| 2,765,699 | 10/1956 | La Torre . |
| 3,129,630 | 4/1964 | Wing et al. . |
| 3,253,495 | 5/1966 | Orloff . |
| 3,276,308 | 10/1966 | Bergere ............................... 411/43 |
| 3,302,510 | 2/1967 | Gapp ................................... 411/93 |
| 3,643,544 | 2/1972 | Massa . |
| 4,007,659 | 2/1977 | Snencel ............................... 411/34 |
| 4,012,984 | 3/1977 | Manscher . |
| 4,089,247 | 5/1978 | Dahl et al. . |

FOREIGN PATENT DOCUMENTS

| | | | |
|---|---|---|---|
| 1472410 | 1/1967 | France ................................. 411/55 |
| 259565 | 4/1970 | U.S.S.R. ............................... 411/43 |

OTHER PUBLICATIONS

Voishan–Drawing #1040 4/1974.

Primary Examiner—Thomas J. Holko
Attorney, Agent, or Firm—Pretty, Schroeder, Brueggemann & Clark

[57] ABSTRACT

A flush break blind fastener is provided having as principle components a stem member, a drive-nut, and a deformable annular means. The stem member has an externally-threaded-portion on the accessible-side thereof, and may have a stem-head on the nonaccessible side thereof. The drive-nut is screwed onto the externally-threaded-portion of the stem member. The deformable annular means has as principle parts a head which is larger in diameter than the diameter of the boreholes of the workpieces, and an intermediate-part adjacent the head, and a deformable tail-part adjacent the intermediate-part and abutting the stem-head for securing the workpieces when the fastener is set. The outer-portion of the stem member contains a turning means for rotating the stem member relative to the drive-nut. Either the stem member or the drive-nut are held fast while rotating the other until the fastener is set and upon further rotation of the stem member relative to the drive-nut will cause the stem member to break at the intersection between the drive-nut and head. Prior to such rotation, the break is facilitated by providing various means in the threaded portion of the stem member. In one embodiment, the threaded portion may be provided with differing sized threads, the narrower diameter thread being at the top to facilitate break at the intersection of the threads.

3 Claims, 9 Drawing Figures

U.S. Patent  Apr. 21, 1987  Sheet 1 of 3  4,659,271
Fig. 9.
Fig. 1. PRIOR ART
Fig. 8.
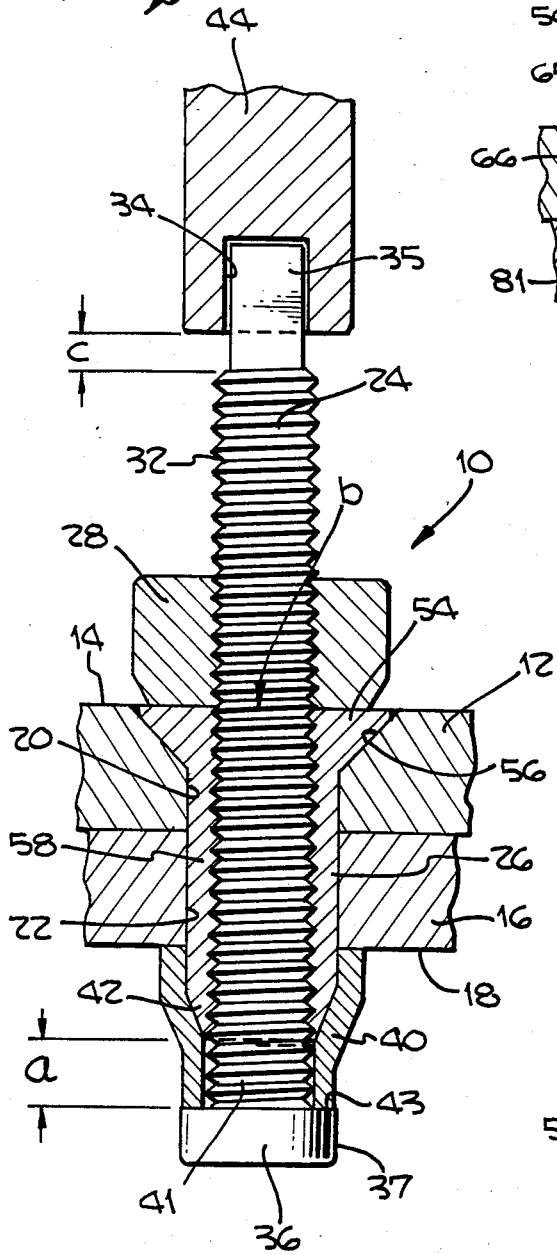
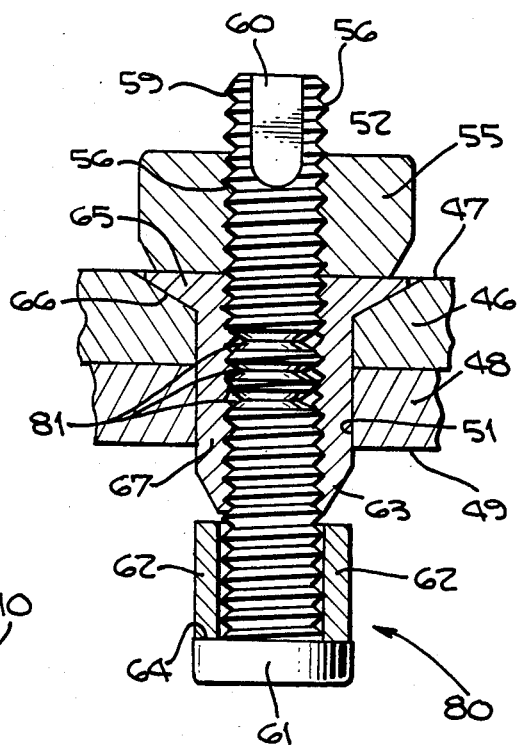
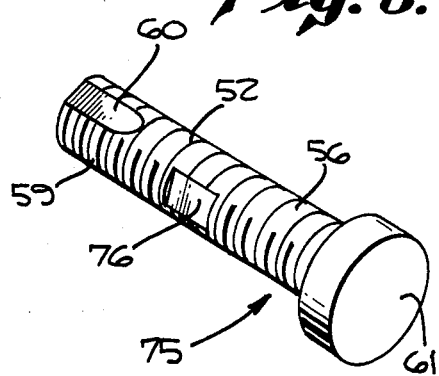

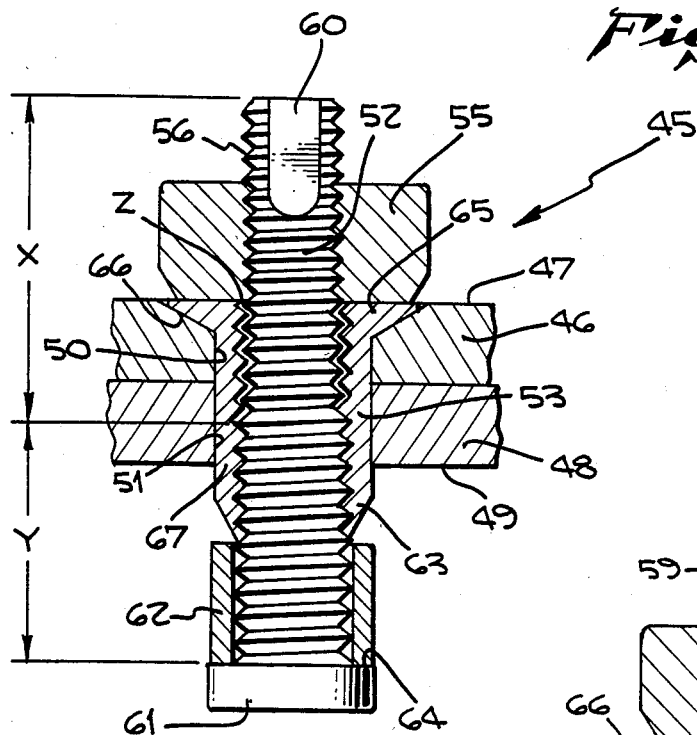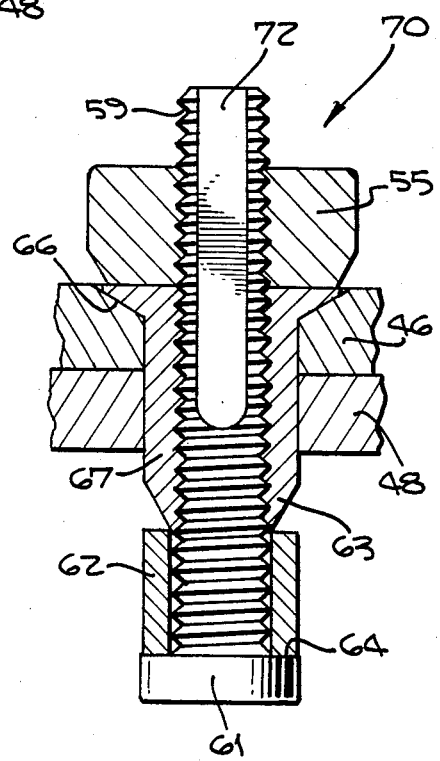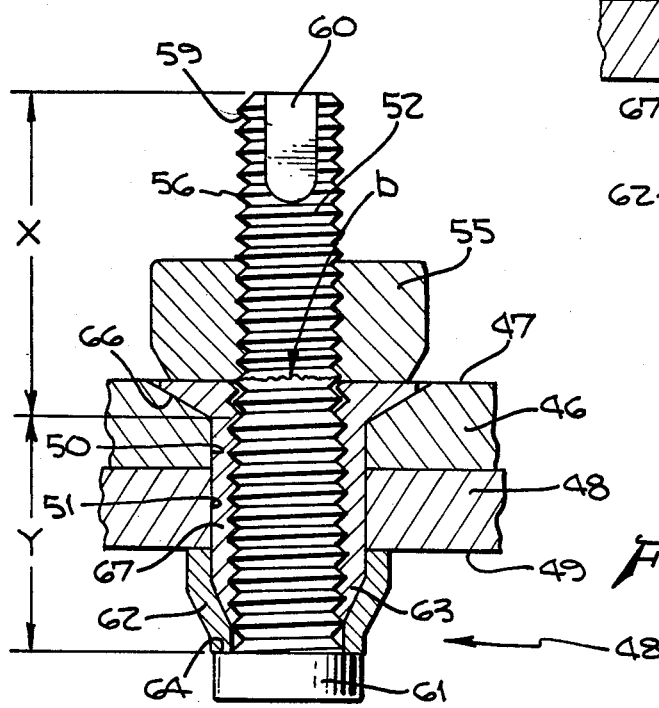

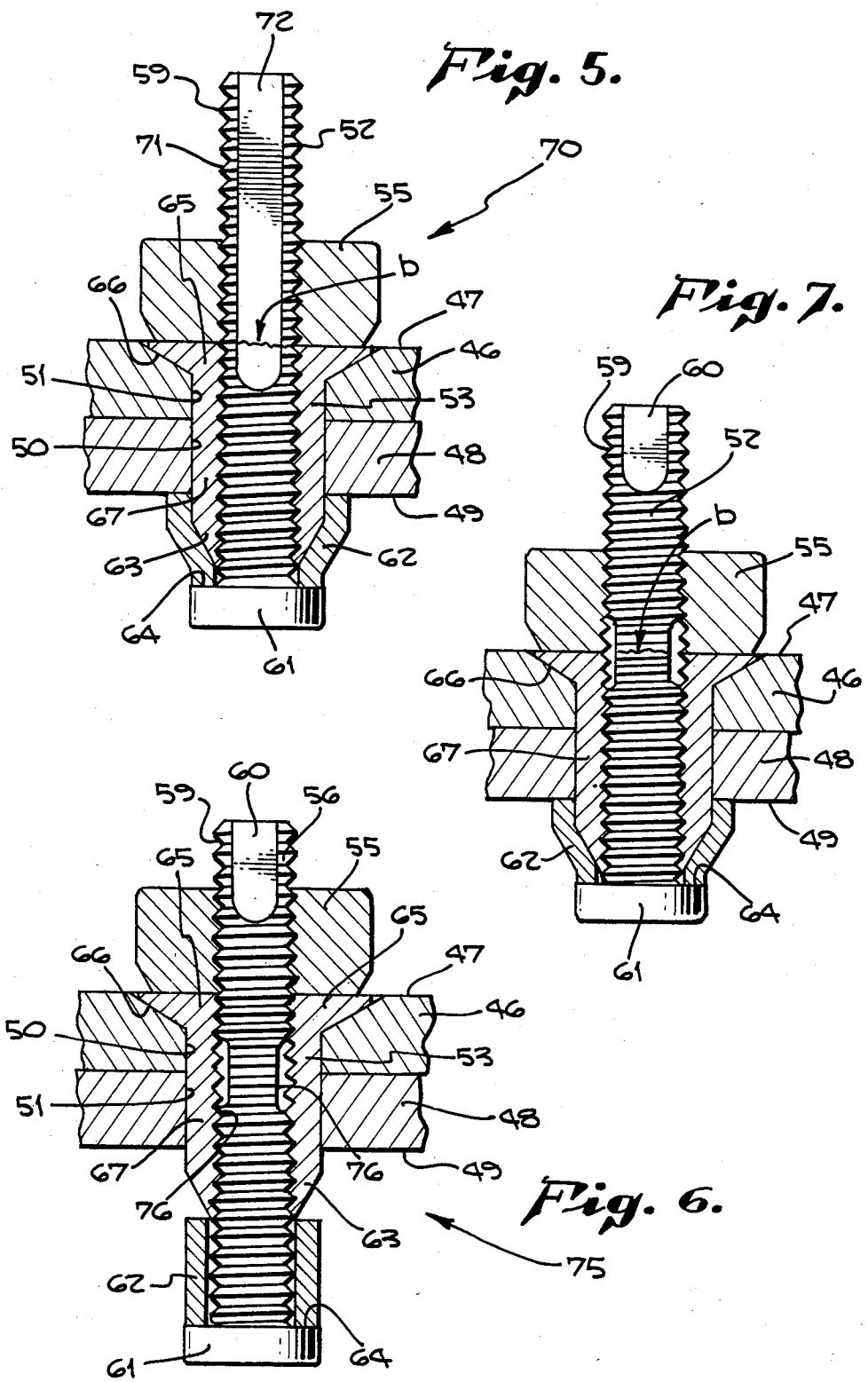

FLUSH BREAK BLIND FASTENER

This application is a continuation of application Ser. No. 583,030, filed Feb. 23, 1984, now abandoned.

CROSS-REFERENCE TO RELATED APPLICATION

This application is directed to subject matter in copending application Ser. Nos. 582,970, filed Feb. 23, 1984 and 583,029, filed Feb. 23, 1984, both abandoned, filed concurrently with this application and commonly assigned.

BACKGROUND OF THE INVENTION

1. Field of the Invention

This invention relates to fasteners, especially blind fasteners, such as rivets which are frequently used in the aerospace industry and in particular in fastening or joining aerodynamic and non-aerodynamic surfaces to structural members of an aircraft.

2. Description of the Prior Art

Blind fasteners are used in a variety of applications wherein access to the blind-side of surfaces being connected together is extremely limited or in some cases not possible. Various particular applications impose unique, stringent requirements for which the fastener must be particularly adapted.

The application in which rivets or fasteners are used in the construction of aerodynamic designs, aircraft and the like, impose some of the most stringent requirements. In particular, the fasteners must secure the members but resist losing their gripping powe under the stresses and vibrations imposed upon them by the harsh environment in which they are used. It is desirable that such fasteners produce a bulbed-like configuration on the blind-side, or non-accessible side, of the workpieces being joined.

U.S. Pat. No. 3,253,495 discloses an assembly consisting of a pin or stem having a head on the blind-side thereof and pull-grooves on the accessible-side thereof, which fits into a sleeve the blind-side portion of which is deformable into a bulbed-like shaped head. To use, the blind bolt assembly is inserted into aligned boreholes of workpieces and a special tool having a plurality of chuck jaws grips the pull-grooves and pulls the pin outwardly away from the nonaccessible workpiece, thereby deforming the sleeve on the blind-side and forming a bulbed-like configuration. Unfortunately this fastener has several disadvantages. First the fastener requires a relatively expensive tool to effect its setting. Furthermore such a tool generally requires a relatively large amount of free-space on the accessible-side in order to grip the pin securely and complete the pulling operation required to set the fastener and form a tightly secured joint. In many situations in the aircraft industry, there is not available sufficient space on the accessible side to accommodate such special tools if such are required for the specific installation. Joints which are not tight must have the fastener drilled out and another joining operation attempted. Such corrective measures greatly increase the cost of fabrication.

Thus it is desirable to have a blind fastener which can be set without the need for specially designed tools and in fact, which can be set with readily available, relatively inexpensive, hand or power tools.

Other disadvantages of the blind bolt of U.S. Pat. No. 2,253,495 are that it has a relatively low preload retention, the importance of which will be subsequently explained, and it has a tendency to loosen its locking collar thereby reducing the gripping power of the bolt and increasing the deterioration of the joint through loss of the stem with subsequent loss of radial rigidity and continual exposure to vibration over longer periods of time.

Another blind rivet, disclosed in U.S. Pat. No. 4,012,984, attempts to overcome the problem of losing the locking collar by providing a locking groove in the stem or pin of the rivet. This groove which is of a smaller diameter than the main body of the stem, is designed to hold the locking collar in the assembled rivet after it is set. The features of the locking collar and its corresponding groove described in U.S. Pat. No. 4,012,984 are useful in this invention and accordingly the relevant teachings of U.S. Pat. No. 4,012,984 is hereby incorporated herein by reference. As in U.S. Pat. No. 3,253,495, U.S. Pat. No. 4,012,984 also has the serious disadvantage of requiring a special tool for gripping the stem portion of the rivet in order to set the rivet.

Both U.S. Pat. No. 3,253,495 and 4,012,984 employ break grooves which enable the surplus portion of the stem, after the rivet is set, to be broken away from the rivet upon further pulling by the special gripping tool. Unfortunately, a relatively rough surface is left on the accessible side of the rivet (as implied by FIG. 5 of U.S. Pat. No. 4,012,984) which is aerodynamically undesirable in streamlined surfaces employed in the aircraft and aerospace industries. Furthermore rivets which are broken totally by tension on the stem with pull tools such as those employed in both U.S. Pat. No. 3,253,495 and 4,012,984 produce an undesirable shock load on the fastener when the stem breaks, due to pin recoil which results in a relatively low preload retention. This problem could, of course, be eliminated in the blind rivet of these types by cutting off the stem rather than rupturing in a stem-pull operation as currently employed. However, it can be appreciated that the added task of cutting off the stem of the rivet is both expensive and time consuming, and in some cases, not possible because of insufficient working space on the accessible side of the rivet.

The blind fastener described in assignee's drawing PLT-1040 consists of a flush nut which is internally threaded over its entire longitudinal length, a deformable sleeve, a core bolt and a drive-nut. After the fastener is set the drive-nut is unscrewed from the core bolt and the stem is cut off and milled flush. Although this fastener has the advantage of eliminating stem or pin recoil it suffers from the disadvantage of requiring an expensive final milling operation to produce a smooth aerodynamically-acceptable surface. Fasteners such as the PLT-1040, are constructed from a high temperature A-286 alloy, and are used on honeycomb structures which can not withstand large amounts of compressive force or "clamp-up." After the fastener is set, the drive-nut is spun off (removed) from the stem member, the excess stem member clipped off, and the remaining stem member milled flush with the outer top surface of the flush-nut.

In order to prevent the removable portion of the stem member or "pin-tails" from inadvertently ending up in a piece of machinery, or laying about the aircraft structure so that it could possibly be sucked into the aircraft engine, thereby seriously damaging such machinery or engine, the aircraft industry laborously accounts for every pin-tail. Since the A-286 alloy and similar high strength, high temperature, alloys are nonmagnetic, a magnetic sweep of the aircraft structure and assembly area to recover the pin-tails is not possible because the drive-nut (which is magnetic) has been removed before the pin-tail is clipped. Thus it is desirable to have a fastener, which when the pin-tail is severed, has the drive-nut still attached to the pin-tail thereby allowing the pin-tail to be recovered by magnetic sweeping. There is another important advantage in having the drive-nut remain with its pin-tail, namely, since the pin-tail is relatively small (and the drive-nut relatively large) the pin-tail can become lodged in small openings from which it is very difficult to discover and effect its recovery.

In pull-type fasteners such as U.S. Pat. Nos. 3,253,495 and 4,012,984 the force exerted on the workpieces by the fastener just before the stem ruptures, referred to as "clamp-up", is significantly higher than the force exerted on the workpieces after the stem is ruptured at the break groove, referred to as "preload retention." This difference or loss of clamping force is attributed to stem recoil occuring at the time of stem rupture. The greater the stem recoil therefore the lower will be the force exerted on the workpieces by the fastener. Accordingly, it is desirable to sever the stem at the break groove in such a manner that stem recoil is eliminated or greatly reduced thereby resulting in higher preload retention.

Further disadvantages of other prior art fasteners are set forth in my copending application, Ser. No. 242,892, commonly assigned, which is hereby incorporated herein by reference.

Accordingly, there is a need for a method of installing a blind fastener with commonly available, relatively inexpensive, hand tools in which the surplus stem-portion can be severed without stem pulling and without expensive post-setting machining such as milling while at the same time producing an aerodynamically smooth surface at the severed stem and a joint having a relatively high preload retention. Such fasteners should induce screw failure at the faying surface of the drive-nut and nut body regardless of the grip condition of the fastener.

SUMMARY OF THE INVENTION

It is an object of this invention to provide an improved method for installing blind fasteners for securing workpieces having aligned boreholes therethrough.

It is a further object of this invention to provide a method for installing blind fasteners wherein the fastener breaks at the faying surface between the drive-nut and nut body regardless of the grip condition of the fastener.

It is a further object of this invention to provide fasteners which break flush at the faying surface between the drive-nut and nut body regardless of the grip condition of the fastener.

These and other objects are preferably accomplished utilizing a fastener having a stem member and a corresponding drive-nut. The stem member has an externally-threaded-portion on the accessible side thereof and may have a stem-head on the nonaccessible-side thereof. The diameter of the stem-head may be slightly smaller than the diameters of the aligned boreholes. The drive-nut has an internally-threaded-portion permitting the drive-nut to be screwed onto the externally-threaded-portion of the stem member.

The fastener further comprises a deformable annular means for securing workpieces together having a lead which is larger in diameter than the diameter of the aligned boreholes, an intermediate part adjacent to the head, such that the combined longitudinal lengths of the head and the intermediate-part is, when the fastener is set, at least equal to the combined thicknesses of the workpieces, and a deformable tail-part adjacent the intermediate-part and abutting the stem-head and having an outside diameter smaller than the diameter of the boreholes for securing the workpieces when the fastener is set. The head is essentially free of a cavity or cavities which are operative for gripping with a tool which will prevent rotation of the annular means.

The fastener also comprises turning means in the outer-portion of the stem member for rotating the stem member relative to the drive-nut.

The improved method includes the turning means and holding the drive-nut stationary while rotating the turning means relative to the drive-nut until the stem member breaks off at the junction between the drive-nut and the head.

The fastener may include a break groove in the stem member which has sufficient radial depth so that when the fastener is set, turning of the stem member relative to the drive-nut will cause the stem member to break at the break groove. The break groove is located at a point on the stem member which is, when the fastener is set, substantially flush with the top outer surface of the head of the annular means. However, breakoff will occur at the junction between the drive-nut and the head even if no break groove is provided in the stem member. Further, the stem member may be held fast with a suitable tool while the drive-nut is rotated which also results in stem breakoff.

In the method disclosed herein, it is not necessary that the drive-nut be removed from the stem member before the stem member is severed. Thus the drive-nut advantageously remains with the severed portion of the stem member so that it can be recovered by a magnetic sweep of the area. Thus, the stem member can be made of nonmagnetic material and, since the broken off piece is attached to the drive-nut, it can be removed along with the drive-nut during such magnetic sweep.

The method disclosed herein enables use of inexpensive fasteners resulting in flush stem-break, and may be installed with lighter, less-expensive, standard hand-tools, have a higher clamp-up and preload retention, and may be installed where the free space on the accessible-side is relatively small.

BRIEF DESCRIPTION OF THE DRAWING

FIG. 1 is a partial cross-sectional view of a prior art blind fastener illustrating basic concepts in installation of such fasteners;

FIG. 2 is a vertical view of a fastener illustrating the teachings of this invention;

FIG. 3 is a cross-sectional view of the fastener of FIG. 2 after the fastener has been set in accordance with the teachings of the invention;

FIG. 4 is a cross-sectional view of a modification of the fastener of FIG. 2;

FIG. 5 is a cross-sectional view of the fastener of FIG. 4 after it has been set;

FIG. 6 is a cross-sectional view of a further modification of the fastener of FIG. 2;

FIG. 7 is a cross-sectional view of the fastener of FIG. 6 after it has been set;

FIG. 8 is a perspective view of the screw along of the fastener of FIGS. 6 and 7; and FIG. 9 is a cross-sectional view of a further modification of the fastener of FIG. 2.

DESCRIPTION OF THE PREFERRED EMBODIMENT

Referring to FIG. 1, a fastener 10 is shown used to join outer and accessible workpiece 12 having accessible surface 14 and inner or nonaccessible workpiece 16 having nonaccessible surface 18. Fastener 10 is inserted through aligned boreholes 20 and 22 of the accessible and nonaccessible workpieces. The principal components of fastener 10 consists of screw or stem member 24, annular means 26 and drive-nut 28.

Stem member 24 is externally-threaded throughout its length at 32 and includes turning means 35 having wrenching flats 34 at one end. The outside diameter 37 of stem-head 36 is just slightly smaller than the diameter of the boreholes 20 and 22. Stem head 36 forms the terminal end of threaded portion 32.

Annular means 26 comprises annular head 54, which is shown as annular but is not necessarily always so, annular shoulder-section 56 and annular main section 58.

A deformable annular sleeve 40 is provided between stem head 36 and surface 18. Of course, prior to assembly, sleeve 40 merely encircles the end 41 of stem member 24 and is not deformed as is well known in the prior art. Also, the terminal end 42 of main section 58 is tapered so that sleeve 40 can ride up thereon and deform between shoulder 43 of stem head 36 and surface 18 all as well known in the art.

In commonly assigned application Ser. No. 583,029, filed Feb. 23, 1984, there is described an apparatus in FIGS. 7 and 8 therein for installing blind fasteners whereby a wrench or similar tool (not shown) is used to hold a drive-nut 28 while a conventional wrenching tool engages flats 34 and either tool is rotated while holding the other until the deformable section of the annular means (section 378 in application Ser. No. 583,029, filed Feb. 23, 1984 deforms and abuts against surface 18. In FIG. 1 herein, deformable sleeve 40 functions similarly as section 378 in application Ser. No. 583,029, filed Feb. 23, 1984. Thus, in like manner, in the arrangement of FIG. 1 herein, the stem 24 may be rotated by turning means 35 until the deformable sleeve 40 deforms and abuts against the surface 18. That is, by rotating member 24 while holding drive-nut 28 firmly against rotation, fastener 10 is set and sleeve 40 is deformed against lower and nonaccessible surface 18 of inner workpiece 16, as shown in FIG. 8 of application Ser. No. 583,029, filed Feb. 23, 1984 with regard to section 378 therein. Further rotation of stem member 24 relative to drive-nut 28 while holding the drive-nut 28 firmly against rotation causes the stem to twist off and break relatively smoothly at the break groove 52 in FIG. 7 in application Ser. No. 583,029, filed Feb. 23, 1984 without stem recoil thereby producing a joint having relatively high preload retention. As discussed in application Ser. No. 583,029, filed Feb. 23, 1984 the torsion created is such that once portion 378 therein reaches the final deformed position shown in FIG. 8 therein, the stem member 24 will break off regardless of whether or not break groove 52 is provided in the stem member 24. Thus, the break groove 52 in FIG. 7 of application Ser. No. 583,029, filed Feb. 23, 1984 may be eliminated. This is the situation illustrated in FIG. 1 herein since no break groove is shown. During installation of screw 24 as heretofore described, the screw 24 is subjected to shear (torsion), tensile and bending stresses. These stresses may cause the screw 24 to fail at any one of three locations a, b or c. Since it is desired to have screw 24 fail at the top surface of the nut body head 54 (i.e., at surface b—but only after clamp-up), it is necessary to either make that location of screw 24 the most highly stressed, or, weaker than the other possible failure points (a or c), or a combination of both.

In other words, during installation of the fastener 10 of FIG. 1, area a is exposed to tension loads equal to the sum of clamp-up (the joint compressive force caused by the sleeve 40 bearing against blind side 18) and the force required to push the sleeve 40 up the tapered nose 42 and along body portion 58. Unless the various components of fastener 10 are perfectly square and concentric, the screw 24 at area a is subjected to binding stresses.

At point b, the screw 24 is subjected to torsion (shear) stress, caused by the torque applied to set the fastener 10 and by tensile stress caused by the "jam nut" effect of the nut head 54 and drive-nut 28. Area c is subjected to torsion, as is the rest of screw 24, but is more highly stressed in torsion than the remainder of screw 24 because wrenching flats 34 cause this area to have a smaller cross section than the remainder of screw 24.

It can be seen, then, that in the installation of fasteners of the type illustrated in FIG. 1, using the technique disclosed in copending application Ser. No. 582,970, filed Feb. 23, 1984, the fastener 10 will tend to fail at area a. If area a were made stronger, the fastener 10 would fail at area c. Since it is desirable for proper installation, using the techniques and methods disclosed in copending application Ser. No. 582,970, filed Feb. 23, 1984, to have the screw 24 fail at point b, it is necessary to modify the fastener of FIG. 1.

Thus, as particularly contemplated in the present invention, referring now to FIG. 2, of the invention, a fastener 45 is shown, similar to that of FIG. 1, used to join outer and accessible workpiece 46 having accessible surface 47 and inner or nonaccessible workpiece 48 having nonaccessible surface 49. Fastener 45 is inserted through aligned boreholes 50, 51 of the accessible and nonaccessible workpieces 45, 48. The principal components of fastener 45 consists of screw or stem member 52, annular means 53 and drive nut 55. Annular means 53 includes head 65, shoulder section 66 and threaded annular main section 67. Stem member 52 is externally threaded throughout its length at 56 and includes turning means 59 having wrenching flats 60 at one end. Stem head 61 is provided at the terminal end of threaded portion 56. A deformable annular sleeve 62 is provided between stem head 61 and surface 49. The terminal end 63 of main section 53 is tapered so that sleeve 62 can ride up thereon and deform between shoulder 64 of stem head 61 and surface 49 as is well known in the art. The final installation position, as will be discussed further, is shown in FIG. 3.

As particularly contemplated in the present invention, it is desirable to induce failure of screw 52 at the faying surface b (FIG. 3) between drive-nut 55 and head 65. As shown in FIG. 2, this is accomplished by making the threads along area x of threaded portion 56 lesser in size than the threads along area y of FIG. 2. That is, the cross-sectional diameter of threads along area x may be less than the cross-sectional diameter of threads along area y. Thus, as seen in FIG. 2, prior to installation, the threads of section 67 of the annular means 53 engage the threaded area y whereas a space z is created between the threads of section 67 and threaded area x. The cross-sectional inner diameter of threaded section 67 is thus related to the cross-sectional diameter of threaded area y. When the fastener 45 is installed in the manner heretofore described and discussed in detail in application Ser. No. 582,970, filed Feb. 23, 1984, until it reaches the condition illustrated in FIG. 3, threaded area x is above and below the faying surface b and threaded area y is below the faying surface b. The screw 56 thus breaks flush along faying surface b and no shaving or other removal of the broken off stem is necessary. The broken off stem piece (along area x in FIG. 3) falls off along with drive-nut 65 to which it is attached and, if nut 55 is of magnetic material, can be retrieved magnetically as discussed in copending application Ser. No. 582,970, filed Feb. 23, 1984.

Referring now to FIG. 4 wherein like numerals refer to like parts of the embodiment of FIGS. 2 and 3, a second fastener 70 is shown. In fastener 70, threaded area 71 of screw 52 differs from area 56 of the fastener 45. Area 71 is of generally uniform cross-section throughout its entire length. However, in this embodiment, flats 72 differ from flats 60 of fastener 45 and extend down along the screw 52 to a point substantially mid-way between head 65 and tapered end 63 of annular means 53. Since the flat area of screw 52, that is, the urea from the upper surface of screw 52 in FIG. 4 to the bottom of flats 72, is obviously of a lesser cross section (and thus weaker) than the non-flat area of screw 52, the fastener 45 will break along faying surface b as shown in FIG. 5 at final installation.

Referring now to FIGS. 6 and 7 of the drawing, another fastener 75 is shown wherein like numerals again refer to like parts of the fastener of FIGS. 2 and 3. In this embodiment, one or more breaking slots 76 (see also FIG. 8) are providing in the body of screw 52 generally at a midpoint along the screw area 56 thereof so that, when assembled as shown in FIG. 6, these slots 76 are located substantially at the junction of surfaces 46 and 48. These slots are cut into the body of screw 52 and thus form a weakened area. When fastener 75 is installed as heretofore described and as shown in FIG. 7, the screw 52 breaks clearly along faying surface b or at a point midway within slot or slots 76. Slots 76 may be one or more and located on one or both sides of screw 52.

Still other means of mechanically inducing failure along faying surface to insure screw failure at that point may occur to an artisan. For example, as shown in FIG. 9 wherein again like numerals refer to like parts of the fastener of FIGS. 2 and 3, fastener 80 may be weakened or annealed at a predetermined point. For example, a plurality of annular break grooves or weakened annealed areas 81 may be provided at a point on screw 52 similar to the location of slot or slots 76 in FIG. 6. Thus, fastener 80 will break at installation in the area of grooves or annealed areas 81 and thus coincident with the faying surface b between nut 55 and head 65.

It can be seen in all embodiments that the various fasteners include mechanical means to insure screw failure at the faying surface between drive nut 28 and nut head 65. Of course, locking collars as discloed in co-pending application Ser. No. 583,029, filed Feb. 23, 1984 may be provided in all embodiments. Also, although separate deformable collars 40 are disclosed herein, obviously the teachings herein encompass the use of a tubular nut similar to those disclosed in copending applications Ser. Nos. 583,029 and 582,970 wherein the deformable element of the fastener is an integral part of the annular means and not a separate element. The stem member may also be of non-magnetic material while the drive-nut may be of magnetic material so that retrieval is effected as described in copending application Ser. No. 582,970.

The techniques and method disclosed herein permits use of fasteners which are relatively inexpensive, can be adopted to have a flush stem-break, can be installed with lighter, less-expensive, standard hand-tools, have a higher clamp-up and preload retention, and can be installed where the free space on the accessible-side is relatively small.

We claim:

1. A blind fastener for mounting in aligned openings through two workpieces to connect them together in overlapped outer and inner relation and adapted to be set by wrench means, comprising:
    an internally threaded, generally tubular fastener body received within the openings in the workpieces having,
        an inner end projecting inwardly beyond the inner workpiece; and
        an enlarged body head received in countersunk relation within the outer workpiece with an outer surface substantially flush with the outer surface of the outer workpiece;
    an externally threaded cylindrical stem passing in threaded engagement through said fastener body, turning motion of said stem relative to said fastener body in one direction moving said stem in an axially outward direction through said fastener body, said stem having,
        an externally threaded first diameter portion for threaded engagement with said fastener body;
        an externally threaded second diameter portion with a diameter less than that of the first diameter portion,
        an enlarged stem head spaced from the inner end of said fastener body; and
        a wrench engaging region spaced from the outer end of said fastener body;
    a deformable sleeve around said stem in contact with said stem head, movement of said stem outwardly through said fastener body deforming said sleeve to a fully set condition in overlying contact with the inner surface of the inner workpiece; and
    an internally threaded drive nut threadedly mounted on the second diameter portion of said stem in abutment with the outer surface of the enlarged body head, said drive nut and said wrench engaging region being engaged by the wrench means to cause turning of said stem in the one direction relative to said drive nut, said drive nut restraining said fastener body from turning in the workpieces during turning of said stem, further relative turning motion in the one direction between said stem and said fastener body, after said sleeve has reached a fully set condition, shearing said stem across the threads in said second diameter portion in substantial alignment with the outer surface of the enlarged body head, the entire said drive nut remaining threaded to the sheared off outer section of the second diameter portion.

2. A blind fastener as defined in claim 1, wherein said drive nut and said fastener body are made of magnetic and nonmagnetic materials, respetively.

3. A blind fastener as defined in claim 1, wherein said drive nut and said stem are made of magnetic and nonmagnetic materials, respectively.

* * * * *